United States Patent [19]
Parsoneault et al.

[11] Patent Number: 5,666,716
[45] Date of Patent: Sep. 16, 1997

[54] LOW DISTORTION INTERFERENCE FITS FOR SPINDLE MOTOR ASSEMBLY

[75] Inventors: Norbert Steven Parsoneault, Watsonville; Hans Leuthold; David John Jennings, both of Santa Cruz; Samnathan Murthy, Campbell, all of Calif.

[73] Assignee: Seagate Technology, Inc., Scotts Valley, Calif.

[21] Appl. No.: 397,566

[22] Filed: Mar. 2, 1995

[51] Int. Cl.$^6$ ............................................. H02K 15/14
[52] U.S. Cl. .................................... 29/596; 29/525
[58] Field of Search ......................... 29/596, 598, 525

[56] References Cited

U.S. PATENT DOCUMENTS

| | | | |
|---|---|---|---|
| 4,739,427 | 4/1988 | Kilmer et al. | 360/97 |
| 4,828,467 | 5/1989 | Brown | 29/525 X |
| 4,920,812 | 5/1990 | Okamoto et al. | 29/525 X |
| 5,313,355 | 5/1994 | Kagen | 360/104 |

*Primary Examiner*—Carl E. Hall
*Attorney, Agent, or Firm*—LaRiviere, Grubman & Payne

[57] ABSTRACT

For a precision spindle motor, an invention for facilitating interference fits of a thrust plate to spindle motor shaft and of a counter plate to journal. A method is provided for assembling a spindle motor using press fits of a thrust plate to a shaft having an undercut for providing a relief to reduce unwanted translation into a thrust gap. A method is also provided for assembling a spindle motor using a press fit of a counter plate to a journal. The counter plate having a chamfer for reducing unwanted translation of the counter plate into a thrust gap. Also, the apparatus employed for the above methods are described.

5 Claims, 3 Drawing Sheets

LOW DISTORTION INTERFERENCE FITS FOR SPINDLE MOTOR ASSEMBLY

TECHNICAL FIELD

The invention relates to computer disk drives. More specifically, the invention relates to an external stator, hydrodynamic spindle motor assembly for a computer hard disk drive.

BACKGROUND ART

Hydrodynamic spindle motors manufactured for hard disk drives are typically made for a confined volume. Consequently, very tight tolerances must be observed. Small deformations owing to press (interference) fitting can violate the requirements of these tight tolerances. Thus, a problem with assembly of spindle motors was controlling the amount of deformation owing to interference fits.

DISCLOSURE OF INVENTION

The present invention is directed at low distortion interference fits for a spindle motor in a hard disk drive assembly. Particularly, the present invention is directed at press fitting a thrust plate to a spindle motor shaft and at press firing a counter plate to a spindle motor journal for an external stator, hydrodynamic spindle motor.

The present invention provides a method of assembly of a precision spindle motor. The method comprises assembling a thrust plate around a top, exposed portion of a spindle motor shaft. The thrust plate is attached to the portion of the shaft by means of a press fit. To reduce axial deformation of the thrust plate for maintaining a consistent thrust gap, an undercut is made in the shaft. The undercut provides a relief for the press firing of the thrust plate to the spindle motor shaft for equalizing interference pressure about a centerline of the thrust plate. The undercut may be exactly specified for causing the net pressure from the press fit to act at the centerline of the thrust plate. In other words, the pressure above the centerline and the pressure below the centerline are approximately to exactly equal. This equalization results in improved perpendicularity, while balancing interference pressure about the centerline of the thrust plate thus reducing warpage.

The present invention also provides a method of press fitting a counter plate to a spindle motor journal. The counter plate is made with a chamfer around its outer periphery. Because the counter plate is pressed into a relatively thin wailed tube-like portion of the journal, the walls forming the tube-like portion tend to bend away from the counter plate, i.e., the thin walls deform in a generally radial direction away from the counter plate. The chamfer extends to the center of the counter plate. The chamfer provides "line contact" with the journal at the centerline of the counter plate. Because of the chamfer, interference pressure acts at the centerline of the counter plate. Thus, there is approximately no net moment which would normally cause the counter plate to warp. As with the thrust plate, the interference pressure is effectively balanced about the counter plate centerline.

As will be apparent to those of ordinary skill in the art of the present invention, the present invention provides a spindle motor, and method of assembling same, which is inherently insensitive (less warpage) to the amount of interference, which allows for larger tolerances on parts thus reducing cost.

Other features of the present invention are disclosed or apparent in the section entitled: "BEST MODE FOR CARRYING OUT THE PRESENT INVENTION."

BRIEF DESCRIPTION OF DRAWINGS

For fuller understanding of the present invention, reference is made to the accompanying drawing in the following detailed description of the Best Mode of Carrying Out the Present Invention. In the drawing.

Figure 1:
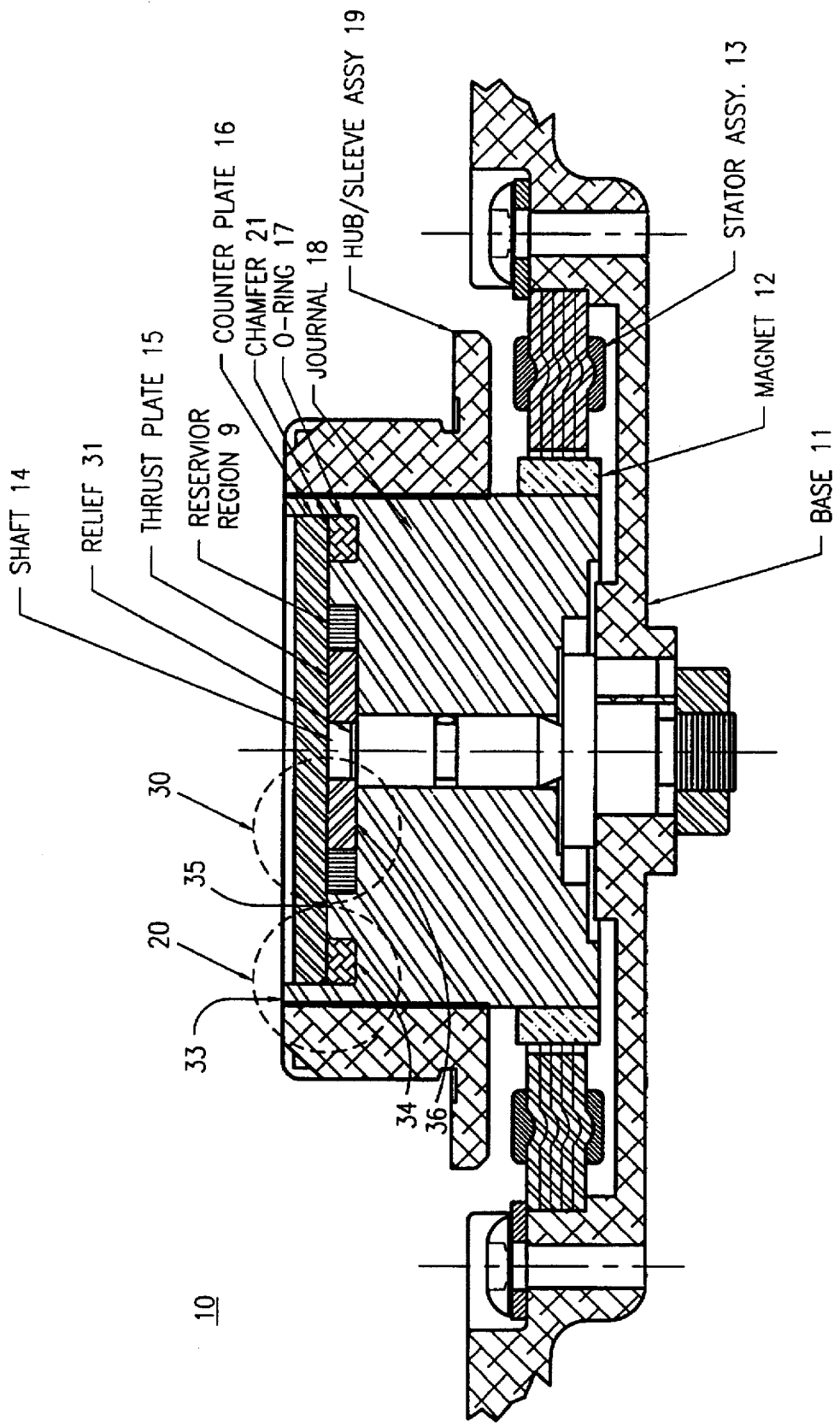
FIG. 1 is a cross section of a portion of a spindle motor in accordance with the present invention.

Reference numbers refer to the same or equivalent parts of the present invention throughout the several figures of the drawing.

BEST MODE FOR CARRYING OUT THE PRESENT INVENTION

As hard disk drives and spindle motors are both well known in the art, in order to avoid confusion while enabling those skilled in the art to practice the claimed invention, this specification omits many details with respect to those known items.

Referring to FIG. 1, there is shown a cross section of spindle motor 10 in accordance with the present invention. Spindle motor 10 is for a computer hard disk drive and comprises base 11, magnet 12, stator assembly 13, shaft 14, thrust plate 15, counter plate 16, o-ring 17, journal 18, and hub/sleeve assembly 19. Spindle motor 10 is particularly well suited for a fluid dynamic bearing application.

Figure 2:
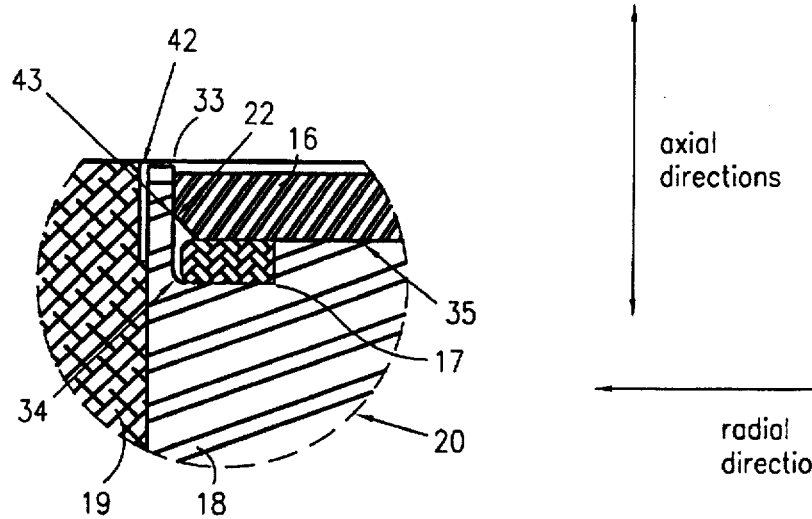
FIG. 2 is an enlarged view of a circled area of FIG. 1.
Figure 2A:
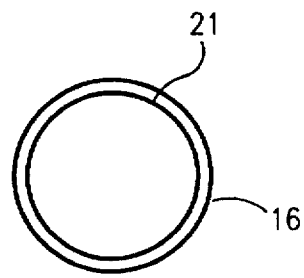
FIG. 2A is a bottom elevation view of a counter plate in accordance with the present invention.

Referring now to FIG. 2, there is shown an enlarged view of circled area 20 of the cross-sectional view of FIG. 1. As shown, counter plate 16 is made having a chamfer 21 in accordance with the present invention. As shown in the bottom elevation view of counter plate 16 in FIG. 2A, chamfer 21 extends around counter plate 16. In the side plan view of counter plate 16 in FIG. 2B, centerline 23 indicates the extension of chamfer 21 to center 22. By extending to center 22, chamfer 21 facilitates "line contact" at centerline 23 as between counter plate 16 and journal 18 when assembled to journal 18.

Protrusion 33 forms a tube-like contour for receiving counter plate 16. The tube-like contour of protrusion 33 of journal 18 is relatively thin as compared with counter plate 16.

Figure 2B:
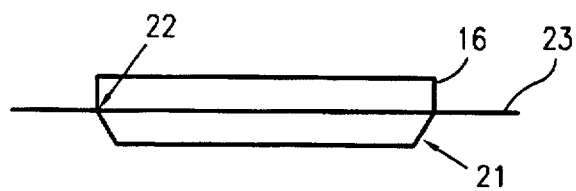
FIG. 2B is a side plan view of a counter plate in accordance with the present invention.

In continued reference to FIG. 2 in combination with FIG. 2B, assembly of counter plate 16 to journal 18 results in interference fit 43. Interference fit 43 causes protrusion 33 to deflect radially away from counter plate 16 and into region 42. Without chamfer 21, counter plate 16 would bow in an axial direction due to pressure from interference fit 43. However, owing to line contact, as facilitated by chamfer 21, between counter plate 16 and protrusion 33 of journal 18, interference pressure between counter plate 16 and protrusion 33 acts at centerline 23 of counter plate 16. This balancing of interference pressure about centerline 23 results in approximately no net moment for inducing counter plate 16 warpage in an axial direction. Consequently, top thrust gap 49 (shown in FIG. 3) requirements are not violated.

Figure 3:
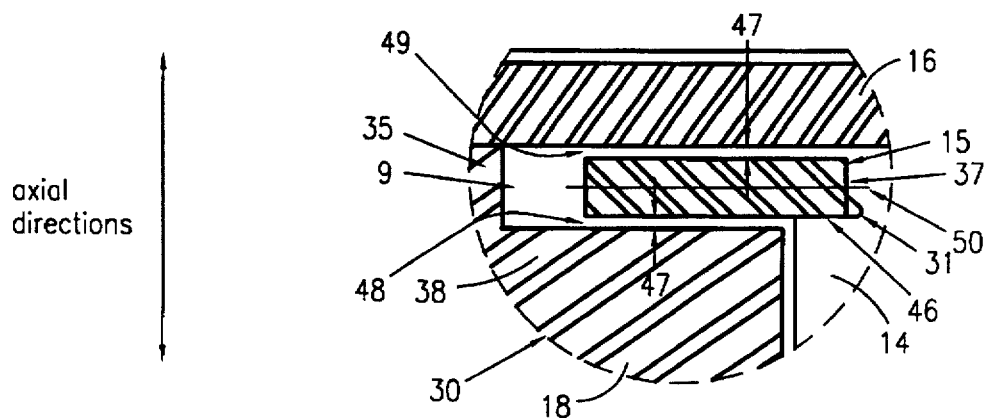
FIG. 3 is an enlarged view of a circled area of FIG. 1.

Referring to FIG. 3, there is shown an enlarged view of circled area 30 of the cross-sectional view of FIG. 1. Shaft 14 is made having a relief 31 in accordance with the present invention. Relief 31 extends around shaft 14 as shown in FIG. 1. Thrust plate 15 is mated with shaft 14 via press fit 37. Reservoir region 9, shown in FIG. 3, comprises two narrow gaps, namely, bottom thrust gap 48 and top thrust gap 49. Reservoir region 9 is particularly well suited for holding lubricating fluid (e.g., oil) for a fluid dynamic bearing application.

Normally, press fit 37 would cause deformation of thrust plate 15 violating thrust gap 48, 49 requirements. However, relief 31 is geometrically shaped balancing interference pressure distribution about centerline 50 of thrust plate 15 such that axial translation of thrust plate 15 is reduced. Relief 31 is shaped for minimizing axial translation of thrust plate 15, by causing the pressure to be approximately equally distributed about centerline 50 of thrust plate 15. As interference pressure owing to press fit 37 is balanced about centerline 50, approximately no net moment results for causing warpage of thrust plate 15 in an axial direction. While the actual resultant shape of relief 31 will depend in part on the geometries involved, the method of the present invention reduces warpage of thrust plate 15 such that thrust gap 48, 49 requirements are not violated.

With reference to FIGS. 1 and 3 in combination, by control of the geometries, the present invention reduces warpage owing to interference fitting counter plate 16 and thrust plate 15 to form spindle motor 10. Thus, with the present invention, substantially uniform and flat widths 47 for thrust gaps 48, 49 may be achieved, i.e., thrust plate 15 and counter plate 16 are ostensibly longitudinally flat after assembly.

Figure 4:
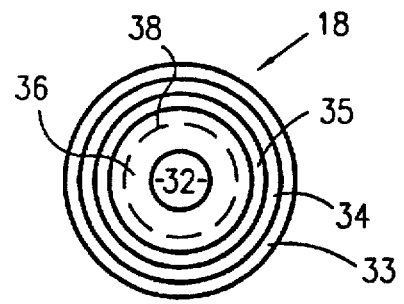
FIG. 4 is a top elevation view of a journal in accordance with the present invention.

Referring to FIG. 4, there is shown a top elevation view of journal 18 in accordance with the present invention. Referring to FIG. 1 in combination with FIG. 3B, journal 18 comprises protrusions 33 and 35. Protrusions 33 and 35 in combination define gap 34. Gap 34 is for receiving o-ring 17. Protrusion 33 defines a gap for receiving counter plate 16, as shown in FIG. 1. Protrusion 35 defines a gap 36 for receiving a portion of shaft 14 and for receiving thrust plate 15. Shaft 14 is received through opening 32 of journal 18. Protrusion 35 defines a boundary of a reservoir region 9 (shown in FIG. 3).

Figure 5:
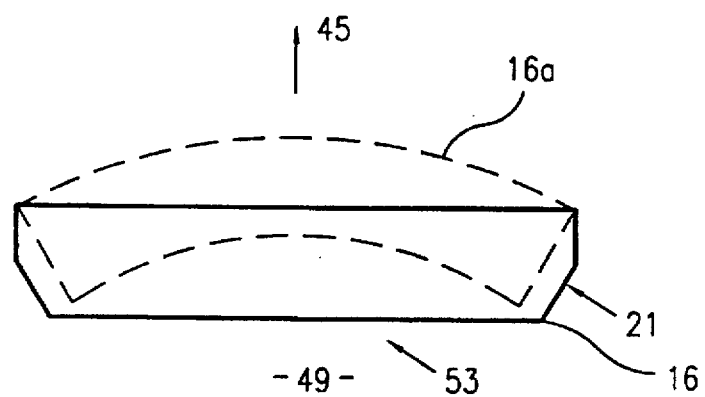
FIG. 5 is a side plan view of a counter plate in accordance with the present invention.

Referring to FIG. 5, there is shown a side plan view of counter plate 16. Without chamfer 21, counter plate 16 would likely bow in an axial direction 45 owing to interference pressure, as indicated by phantom counter plate 16a. Consequently, top thrust gap 49 would be increased, especially in central region 53.

Figure 6:
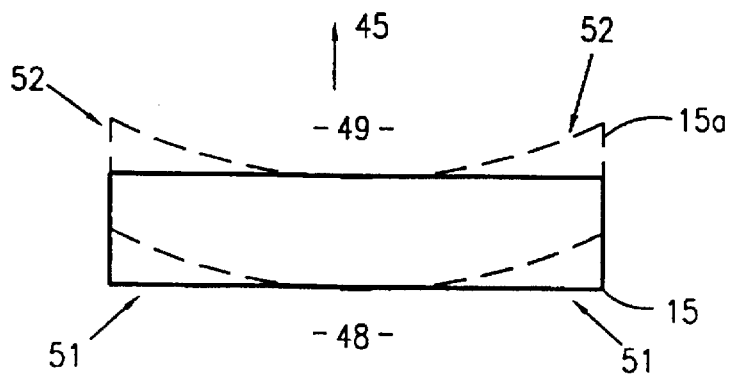
FIG. 6 is a side plan view of a thrust plate in accordance with the present invention.

Referring to FIG. 6, there is shown a side plan view of thrust plate 15. With continuing reference to FIG. 6 in combination with reference to FIG. 3, without relief 31, thrust plate 15 would likely warp at each end in axial direction 45, as indicated by phantom thrust plate 15a. Consequently, top thrust gap 49 would be narrowed to obliterated, especially at distal regions 52, and bottom thrust gap 48 would be increased, especially at distal regions 51. The amount of warpage of thrust plate 15a will vary owing to the specific geometries of the assembled parts. For example, the extent of shoulder 46 of shaft 14 likely will affect the amount of warpage of thrust plate 15a. Thus, it is necessary that relief 31 be formed to an appropriate extent bordering thrust plate 15 to achieve balanced distribution of interference pressure about centerline 50.

Referring to FIGS. 1 and 3 in combination, motor 10 stiffness is dependent in part on maintaining thrust gaps 48, 49. By maintaining thus gaps 48, 49, minimum widths for those gaps are provided. However, it is further important that gaps 48, 49 be substantially uniform, i.e., maximum and minimum width tolerances must be maintained and warpage must be minimized to maintain flatness. Typically, thrust plate 15 and counter plate 16 are made exceptionally flat, namely, flat to approximately one-half (½) micron. If thrust gap 48 or 49 is narrowed, then motor 10 is more subject to rubbing and/or seizing, i.e., very stiff. A motor 10 operating at approximately 10,000 revolutions per minute (rpm) suddenly seizing is not desirable. Moreover, owing to the operation of motor 10, if thrust gap 48 or 49 is widened, then motor 10 is less stiff, resulting in loss of load carrying capability. Therefore, it should be appreciated that even slight deformations of counter plate 16 and thrust plate 15 may affect performance of motor 10, especially where thrust gaps 48 and 49 are very narrow, namely, typically on the order of seven (7) microns wide. For thrust gaps which are especially narrow, approximately a five percent (5%) tolerance for each thrust gap 48, 49 is typical. (Notably, while specific values are stated herein, it should be understood that these values, e.g., speed of 10,000 rpm, flat within ½ micron, width of 7 microns, and tolerance of 5%, are merely illustrative of one embodiment of the present invention; it should be understood that the present invention may be practiced with other values for different embodiments.)

Consequently, the present invention provides method and apparatus for assembly of a spindle motor with the above-described interference fits while maintaining tight thrust gap tolerances. While the present invention has been particularly shown and described with respect to certain preferred embodiments and features thereof, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

We claim:

1. A method of assembly of a precision spindle motor, the method comprising the steps of:

providing a shaft assembled to a journal, a top portion of the shaft being made with an undercut for providing a first relief;

press fitting a thrust plate around the top portion of the shaft, the first relief shaped for reducing warpage of the thrust plate for maintaining a substantially uniform width for a first thrust gap between the journal and the thrust plate; and press fitting a counter plate to the journal, the counter plate being made with a chamfer extending to the center of the counter plate, the chamfer providing a second relief, the second relief for reducing warpage of the counter plate by providing centerline contact between the journal and the counter plate.

2. A method of assembly of a hydrodynamic, hard disk drive spindle motor, the method comprising the steps of:

providing a journal defining a central shaft opening;

locating a shaft in and through the central shaft opening, a top portion of the shaft extending though the journal, the top portion of the shaft and a first protrusion of the journal defining a first gap, the top portion of the shaft made with an undercut for providing a first relief;

press fitting a thrust plate down and around the top portion of the shaft and into a portion of the first gap, a remaining portion of the first gap as bounded by a lower surface of the thrust plate and the journal defining a first thrust gap, the thrust plate bordering the undercut for reducing warpage of the thrust plate in an axial direction in order to provide a substantially uniform width for the first thrust gap;

inserting an o-ring, the o-ring inserted in a second gap, the second gap defined by the first protrusion and a second protrusion of the journal, the second protrusion extending above the first protrusion; and press fitting a counter plate down into a region defined by the second protrusion and up against the second protrusion, the counter plate made with a chamfer, the chamfer extending around a bottom half of an outer periphery of the counter plate.

3. The method of claim 2 wherein the chamfer provides a second relief for reducing warpage of the counter plate in an axial direction.

4. The method of claim 3 wherein the counter plate and the thrust plate in combination define a second thrust gap therebetween.

5. The method of claim 4 wherein the chamfer and the undercut in combination are for providing a substantially uniform width for the second thrust gap.

* * * * *